United States Patent Office 3,427,726
Patented Feb. 18, 1969

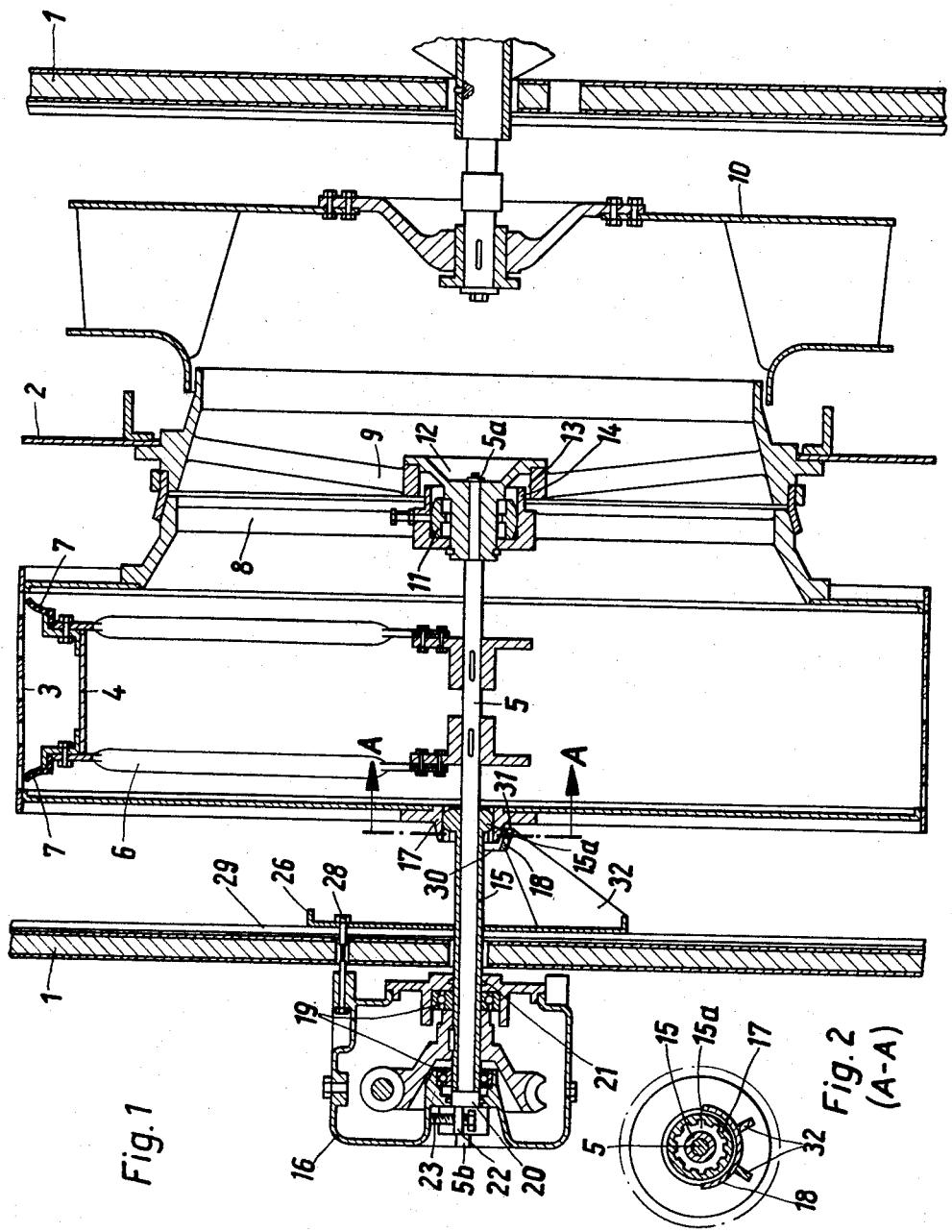

3,427,726
SIEVE DRUM INSTALLATION
Gerold Fleissner, Frankfurt am Main, Germany, assignor to Anstalt fur Patentdienst, Vanduz, Liechtenstein
Continuation-in-part of application Ser. No. 451,275, Apr. 27, 1965. This application Jan. 23, 1968, Ser. No. 699,930
Claims priority, application Germany, Apr. 29, 1964, 5,577/64
U.S. Cl. 34—122    9 Claims
Int. Cl. F26b *11/02;* B23p *7/00*

ABSTRACT OF THE DISCLOSURE

The present disclosure relates to a sieve drum installation which provides means for supporting the sieve drum during assembly and repair operations. More particularly, the present disclosure is directed to a bearing block or support means secured to a plate of profiled iron mounted on a framework which is disposed on the inner side of the chamber wall. The bearing block supports a bearing flange which in turn provides support for the sieve drum during assembly and repair. Since the support of the present disclosure is secured to the framework, it can support the sieve drum even when the chamber wall is removed.

Background of the invention

This is a continuation-in-part application of application Ser. No. 451,275 filed Apr. 27, 1965.

The present invention relates to an apparatus with a rotatably supported sieve drum having a stationary internal baffle plate disposed therein. The apparatus of the present invention can be used for a large variety of purposes, for example for the treatment of textiles, for example, drying, steaming, washing, dyeing, etc. textile materials and also for the treatment of veneers.

The entrainment, i.e., the carrying and guiding of the material to be processed by the outer drum jacket is effected by means of a suction draft created by a fan arranged preferably at the side of the drum. The fan draws the liquid or gaseous treatment medium out of the inside of the drum so that, compared with the space surrounding the drum, a partial vacuum is produced in the drum interior. Because of the partial vacuum which is created the treatment medium rapidly penetrates through the material to be processed.

Since the suction draft should only prevail at that portion of the drum which is covered by the material being treated, the suction draft is interrupted at the other portion of the sieve drum jacket free from material to be processed by a stationary internal baffle plate. This internal baffle plate offers the advantage that the material does not adhere to the sieve drum at this portion and that it thus can be easily detached or removed again from the drum jacket and passed to another sieve drum or to the discharging device. Since the internal baffle plate and the sieve drum carry out a relative rotary motion with respect to each other on a common shaft, it is necessary to provide for a mutual bearing support.

In particular the following conditions must be met for the bearing of the sieve drum and of the internal baffle plate:

(a) The drum drive has to be led around the stationary baffle plate shaft.

(b) In order to achieve an effective circulation of the treatment medium through the material to be processed and through the drum jacket, one side of the drum has to be provided with a sufficiently large opening through which the treatment medium can leave the drum.

(c) The drum and internal baffle plate and their bearings are exposed to considerably different temperatures whereas the drum drive outside the processing chamber is exposed to relatively balanced temperature conditions. In order to avoid strain and stresses in the bearings, the changes in length caused by differing thermal expansion has to be balanced.

(d) It must be possible, within certain limits, to subsequently adjust the position of the internal baffle plate.

Apparatus with rotating sieve drums having stationary baffle plates are already known in the prior art. With these prior art apparatus, the shaft to which the internal baffle plate is rigidly secured rests on one side in a concentric bore of a cast-iron spider and on the other side in a bearing which is inserted in a concentric bore of the driving shaft. The rotatable sieve drum is connected with the stationary baffle plate shaft by way of bearings, preferably friction bearings. At its inner end the driving shaft is provided with a clutch flange which is similar to a jaw clutch in its design. For purposes of equalizing thermal expansions the jaw clutch has a certain axial play with respect to the sieve drum and the baffle plate shaft.

These known devices entail considerable disadvantages. All bearings of the sieve drum and of the baffle plate shaft are exposed to very high temperatures and the considerable temperature fluctuations which occur in the treatment chamber. Furthermore, the bearings are exposed to the usually corrosive treatment medium; also contamination and sailing of the bearings can occur relatively quickly. Due to the high temperatures, the material for the bearings have to meet extraordinarily high requirements. In general, the bearings cannot be lubricated. Since the sieve drum rests on the baffle plate shaft, strains and stresses in the bearings might also result in the prior art devices, which are caused by the different thermal expansions of the sieve drum and the baffle plate shaft. Another disadvantage of the hitherto known bearings for sieve drums is that the rotating outer rings or races of the bearings carry the total load which, in the long run, affects their loading capacity. Another disadvantage of prior art sieve drum installations resides in the fact that the baffle plate can only be adjusted and brought into its most favorable position with the drum at standstill. However, whether or not the internal baffle plate is in its most favorable position can normally only be decided when the drum is rotating and covered with material. For readjustment, the drum has to be stopped again in the prior art devices because readjustment can only be effected inside the drum. Therefore, readjustment is difficult and time-consuming with the prior art constructions.

Summary of the invention

An object of the present invention is to avoid the aforementioned disadvantages as much as possible.

Another object of the present invention resides in a sieve drum provided with drive means in which the bearings are protected against exposure to high temperatures and to the corrosive treatment medium used within the drum.

A further object of the present invention resides in a rotatable sieve drum used for drying goods in which the bearings are protected against soiling while enabling access to permit servicing and lubrication.

Still another object of the present invention resides in a provision of a rotatable sieve drum in which differing thermal expansions can be readily absorbed without producing stresses within the bearing supports.

A still further object of the present invention resides in the provision of a rotating sieve drum which can be readily adjusted during rotation to permit an adjustment of the internal baffle plate with the drum rotating under normal operating conditions.

Another object of the present invention resides in the provisions of a sieve drum which can be readily assembled and disassembled thereby facilitating not only the initial assembly but also subsequent repairs.

A further object of the present invention resides in the provision of a rotating sieve drum enclosing a stationary baffle plate in which the mutual bearing supports between the rotatable and stationary elements are so constructed and arranged as to minimize the danger of serious damage to the assembly in case of denting of the drum jacket.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In accordance with the present invention and in solution of the underlying problems, the sieve drum is provided with at least one bearing apart or separate from the baffle plate shaft, which bearing is no longer exposed to the medium but which is supported essentially concentrically to the baffle plate shaft. In order to facilitate mounting, repair work, and especially replacement of the bearings, and in a modification of the invention, it is suggested in accordance with the present invention to provide securing or supporting elements for the sieve drum within the device which elements maintain the sieve drum essentially in its working position.

According to another modification of the present invention, it is suggested to mount the hollow driving shaft which supports the drum on the drive side thereof, outside the treatment chamber concentrically to the baffle plate shaft, preferably in the drive housing within which is also mounted the baffle plate shaft, though the baffle plate shaft may also be fixed in a second housing.

According to a further feature of the present invention, it is suggested to mount the drum on the hollow driving shaft with axial play and, within certain limits, pivotable to all sides, i.e., universally pivotal, but formlockingly in the direction of rotation. In order to ensure that the sieve drum can be maintained in its working position also on the drive side during assembly or mounting and repair work, it is further proposed to arrange a bearing block or support for the bearing flange which is rigidly connected with the sieve drum on the drive side which bearing block supports the sieve drum.

In accordance with the present invention, a subsequent adjustment of the position of the internal baffle plate, also while the sieve drum is rotating, becomes possible within certain limits if the baffle plate shaft passes through the drive housing and if the shaft end is provided with a device which permits adjusting and fixing of the baffle plate shaft. This adjusting device may, for example, consist of a toggle in the form of a double-armed lever which is fixed to the end of the baffle plate shaft passing through the drive housing and which is provided at the ends thereof with two set screws or similar parts which rest against the gear housing.

A significant advance in accordance with the present invention is that the device for adjusting and fixing the baffle plate shaft may, at the same time, serve the purpose of protecting the drum jacket and the internal baffle plate against serious damage if the drum jacket is dented. Thus, the device secures only up to a certain predetermined torque the baffle plate shaft against rotation and if that torque is exceeded, the baffle plate shaft can rotate thus making it possible for the internal baffle plate to rotate together with the sieve drum. Such a protective device is completely new. Hitherto denting of the sieve drum jacket generally resulted in such heavy damage to the drum jacket and the internal baffle plate that the entire sieve drum unit together with the internal baffle plate had to be disassembled and replaced with a new one.

It is particularly advantageous to rotatably support the baffle plate shaft on the fan side thereof in an intermediate piece on which also the sieve drum is rotatably mounted, preferably by way of a friction bearing, and to connect the intermediate piece with the fan partition wall by way of the cast-iron spider.

In order to support the sieve drum on the fan side during replacement of the bearing, it is suggested according to a further feature of the present invention to provide the cast-iron spider with a hole or bore concentric to the baffle plate shaft, whereby a preferably sleeve-shaped attachment at or of the drum cross projects or extends into this bore. Also the cast-iron spider may be provided with an attachment or extension which engages in a hole or annular recess of the drum cross. In order to constitute the bearing support of the sieve drum on the fan side yieldingly or pivotably to all sides, within certain limits, it is further suggested to use therefore, for instance a hemispherical bearing.

Brief description of the drawings

These and further objects, features, and advantages of the present invention will become more obvious from the following description when taken in connection with the accompanying drawing which shows, for purposes of illustration only, one embodiment in accordance with the present invention, and wherein:

FIGURE 1 is a longitudinal cross section through a sieve drum with drive and fan wheel according to the present invention, FIGURE 2 is a cross section taken along line A—A of FIGURE 1.

Description of the preferred embodiments

Figure 3:
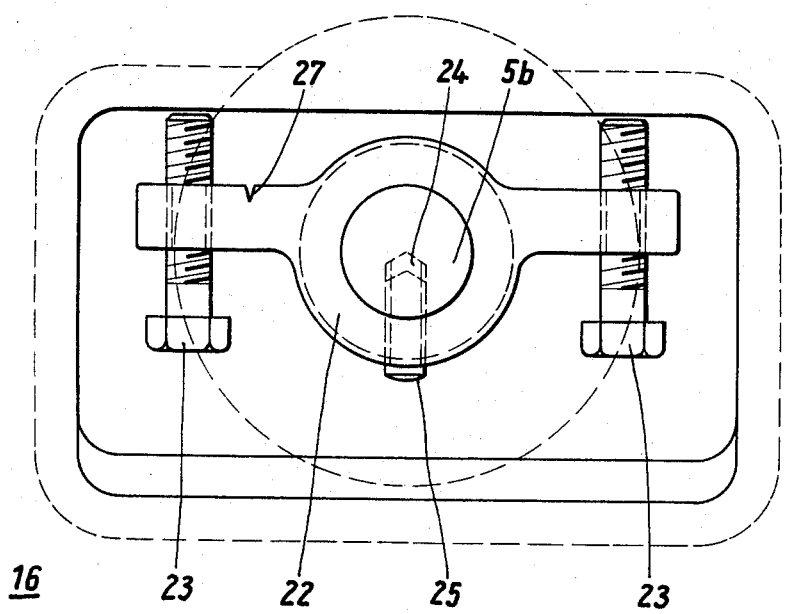
FIGURE 3 is an elevational view of the device for adjusting and fixing the baffle plate shaft in accordance with the present invention.

Referring now to the drawing wherein like reference numerals are used throughout the various views to designate like parts, it may be readily seen from FIGURE 1 that there is disposed between a left-hand outer wall 1 of a chamber and a partition wall 2 of a fan, which separates a treatment chamber from a fan chamber, a sieve drum 3 whose internal baffle plate 4, 7 is supported by a stationary shaft 5 by way of arms 6. One side or end face of the sieve drum 3 is connected with a drum cross 8, which in turn, is adjoined by or connected to a cast-iron spider 9 and a fan wheel 10. For example, a friction bearing 11 is accommodated with its outer ball face in a hole or bore of the drum cross 8 and with its inner ball face on a sleeve-shaped attachment or extension of an intermediate piece 12 which is concentrically mounted in a bore 13 of the cast-iron spider 9. One end 5a of the shaft 5 is rotatably mounted within the bore of the intermediate piece 12. For supporting the sieve drum 3, when replacing the bearing 11 or during assembly, the drum cross 8 is provided with an attachment or extension 14 which projects into the bore 13 of the cast-iron spider 9.

For supporting the sieve drum 3 on the drive side, a bearing flange 17 is secured to the side or end face of the sieve drum 3. The bearing flange 17 is provided with a bore having splines, into which projects one end of a hollow driving shaft 15 having a ball-shaped splined shaft attachment or extension 15a. The hollow driving shaft 15 is supported within the drive housing 16 by means of antifriction bearings 19 which hollow driving shaft supports a conventional worm gear. On the drive side end 5b, the shaft 5 is also supported within the drive housing 16 by way of a supporting ring 20, and thus outside the treatment chamber. The bearings in the drive housing 16 are sealed against the treatment chamber or separated from the treatment chamber by means of packings 21. A bearing block or support 18 is secured to a plate 26 which in turn is secured to a framework 29 of profiled iron mounted on or provided at the inner side of the chamber wall 1. On the bearing block 18 rests the bearing flange 17 during mounting and repair work, which maintains the sieve drum 3 in its working position on the drive side during said work. The bearing block 18 is only mounted to the plate 26. In the vicinity of the hollow shaft, the bearing block is in the shape of a half-ring which normally, that is, when the sieve drum and the drive shaft are assembled, is not in communication with these parts. Only during the assemblage is the hollow drive shaft, or the flange 17, supported in this half-ring 18 serving as the bearing block. Elements 32 are the supporting arms on which the half-ring is mounted. The supporting arms are fastened to the plate 26. The plate 26 is neither mounted to the drive housing 16 nor to the outer wall 1 of the chamber. Rather, it is mounted on a frame 29 of profiled iron mounted on the inner side of the chamber wall 1. This frame has also mounted thereto the chamber wall 1. The drive housing 16 is mounted to the plate 26 by way of bolts 28. The line 30 denotes one edge of the half-ring bearing block 18. The other edge is shown by line 31.

Section A—A is a cross-sectional view of the bearing block 18 and of the bearing flange 17 of the sieve drum which engages therein. In this construction, the bearing block has two supporting arms 32 which are secured to the plate 26 carrying the drive housing. The plate 26, in turn, is secured to the frame 29 which also supports or carries the outer chamber wall 1. The frame 29 consists generally of sectional iron. The two supporting plates are provided at the narrow ends thereof with a half-ring portion 18 enclosing the bearing flange 17. During the operation, there is a slight distance or spacing between this half-ring 18 and the bearing flange 17 so that these parts will have no mutual contact. During the assembly, the drive housing 16 is taken off. As a result, the sieve drum will be lowered by about 1 to 2 mm. and will thereupon come to rest with the bearing flange 17 on the half-ring portion 18. Therefore, only during assembly and/or repair is the bearing flange 17 placed into the half-ring bearing block 18 and held thereby. The bearing block thus supports the bearing flange which in turn provides support for the sieve drum during assembly and repair. Since the support of the present invention is secured to the framework, it can support the sieve drum even when the chamber wall is removed.

A toggle 22 (FIGURES 1 and 2) is secured to the outer shaft end 5b of shaft 5, which extends through drive housing 16, which toggle 22 has the form of a double-armed lever and is provided with set screws 23 at both ends thereof, which set screws abut against the drive housing 16 and fix the position of the shaft 5. By adjusting the set screws 23 it is possible to rotate the shaft 5, within certain limits, and thus to adjust the internal baffle plate 4 which is rigidly connected with the shaft 5.

The cross section of the lever arms of the toggle 22 can be so dimensioned, for instance, by a fracture notch 27, that they break when a predetermined torque is reached and thus release the baffle plate shaft and the internal baffle plate for rotation in unison with the sieve drum 3. The fraction notch shown is only exemplary of the type which can be used and can advantageously be disposed in either lever arm of the toggle 22. Also it is possible to provide a shearing pin safeguard; in that case a pin 25 is hammered or driven into a radial bore 24 of the toggle 22 and of the shaft 5 which pin prevents the toggle 22 from rotating with respect to the baffle plate shaft 5. At a certain predetermined torque the pin 25 is sheared off and the shaft 5 is free to rotate.

With the illustrated embodiment of the drum bearing on the drive side, thermal expansions which cause an axial movement of the bearing flange 17 can be easily compensated by the axial play between the splined shaft extension 15a and the bearing flange 17. Furthermore, the ball-shaped form of the splined shaft extension 15a, shown in FIGURE 1, ensures, within certain limits, that the bearing flange 17 on the hollow driving shaft 15 can move to all sides while a form-locking connection is provided by the splined shaft connection 17, 15a in the direction of rotation. With the bearing of shaft 5, shown in FIGURE 1, also any thermal expansion between dryer housing and shaft 5 can be easily compensated without attendant stresses.

Since the two antifriction bearings 19 are accommodated within the drive housing 16 and thus outside the treatment chamber, it is easily possible to lubricate the bearings without detrimental effects from the drum interior and thus to ensure a long lifetime of the antifriction bearings.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A sieve drum installation which comprises a substantially closed chamber, at least one cylindrical sieve drum means rotatably disposed within said closed chamber, said sieve drum having a fan side and a drive side, drive means including bearing means disposed within a drive housing on the drive side for the driving said sieve drum, said drive means also including a hollow drive shaft means, bearing block means separate from the drive means and disposed concentric to the hollow drive shaft, said bearing block means being secured to a plate means which in turn is secured to a framework disposed on the inner side of the chamber wall on the drive side, and bearing flange means secured to the end face of the sieve drum means on the drive side, the bearing block means providing support for the bearing flange means thereby maintaining the sieve drum in its working position on its drive side during mounting and repairing.

2. The sieve drum installation of claim 1, wherein during normal operation the bearing block means is not in communication with the bearing flange means or the hollow drive shaft.

3. The sieve drum installation of claim 1, wherein the framework is profiled iron.

4. The sieve drum installation of claim 1, wherein the bearing block is mounted on supporting arms, said supporting arms securing the bearing block means to the plate means.

5. The sieve drum installation of claim 1, wherein the chamber wall is mounted to the framework and the drive housing is mounted to plate means.

6. The sieve drum installation of claim 5, wherein the framework supports the sieve drum when the chamber wall is removed.

7. A sieve drum installation which comprises a substantially closed chamber, at least one cylindrical sieve drum means rotatably disposed within said closed chamber, said sieve drum means having a fan side and a drive side, internal baffle means disposed within said sieve drum means and supported by a stationary shaft means axially positioned within said sieve drum, drive means disposed within a drive housing for driving said sieve drum including a hollow drive shaft means disposed about said stationary shaft means, said drive housing separately accommodating said stationary shaft means and said hollow drive shaft means and positioned outside of the treatment chamber, said hollow drive shaft means having a ball-shaped extension communicating with a bearing flange means rigidly secured to said sieve drum to enable axial play and universally pivotable movement therebetween while providing a form-locking connection in the direction of rotation and bearing block means separate from the drive means and disposed concentric to the hollow drive shaft, said bearing block means being spaced apart from the bearing flange means and secured to a framework provided on the inside of the chamber wall, said bearing block means being adapted to support the bearing flange means and thus the sieve drum on its drive side during mounting and repairing.

8. The sieve drum installation of claim 7, wherein adjusting means are operatively connected with the stationary shaft means providing for subsequent adjustment of the position of said internal baffle plate means during rotation of said sieve drum means.

9. The sieve drum installation of claim 8, wherein the adjusting means comprises a toggle member in the shape of a double-armed lever member secured to said shaft means, each arm of said double-armed lever containing a set screw which operably abuts the drive housing thus providing for the desired adjustment, and means provided for protecting the drum jacket and internal baffle plate against damage in case of denting of the jacket means, said protecting means preventing said shaft containing the baffle plate from rotating with said sieve drum up to a predetermined torque but permitting rotation of said shaft containing the baffle plate with said sieve drum when said torque is exceeded.

References Cited

FOREIGN PATENTS 1,145,127  3/1963  Germany.

FREDERICK L. MATTESON, Jr., *Primary Examiner.*

A. D. HERRMANN, *Assistant Examiner.*

U.S. Cl. X.R.

29—401